(12) United States Patent
Choi et al.

(10) Patent No.: US 10,570,283 B2
(45) Date of Patent: Feb. 25, 2020

(54) THERMOPLASTIC TRANSPARENT RESIN COMPOSITION FOR WHEEL RUST COVER AND METHOD FOR PREPARING THE SAME

(71) Applicants: HYUNDAI MOTOR COMPANY, Seoul (KR); KIA MOTORS CORPORATION, Seoul (KR); LG CHEM, LTD., Seoul (KR)

(72) Inventors: Min Ho Choi, Seoul (KR); Won Seok Lee, Daejeon (KR); Seok Goo Jang, Yeosu-si (KR); Jeong Su Choi, Daejeon (KR)

(73) Assignees: HYUNDAI MOTOR COMPANY, Seoul (KR); KIA MOTORS CORPORATION, Seoul (KR); LG CHEM, LTD., Seoul (KR)

( * ) Notice: Subject to any disclaimer, the term of this patent is extended or adjusted under 35 U.S.C. 154(b) by 123 days.

(21) Appl. No.: 15/846,036

(22) Filed: Dec. 18, 2017

(65) Prior Publication Data

US 2019/0127569 A1    May 2, 2019

(30) Foreign Application Priority Data

Nov. 1, 2017   (KR) .......................... 10-2017-0144560

(51) Int. Cl.
    *C08L 33/20*    (2006.01)
    *B60B 7/02*     (2006.01)
(52) U.S. Cl.
    CPC ................ *C08L 33/20* (2013.01); *B60B 7/02* (2013.01); *B60B 2360/32* (2013.01); *B60B 2900/141* (2013.01); *C08L 2201/10* (2013.01); *C08L 2205/02* (2013.01); *C08L 2205/06* (2013.01)

(58) Field of Classification Search
    CPC .. C08L 33/20; C08L 2201/10; C08L 2205/02; C08L 2205/06; B60B 7/02; B60B 2360/32; B60B 2900/141
    See application file for complete search history.

(56) References Cited

U.S. PATENT DOCUMENTS

2013/0274416 A1*  10/2013  Choi .................... C08F 279/02
                                                          525/86

FOREIGN PATENT DOCUMENTS

KR       10-2012-0071941 A       7/2012

* cited by examiner

*Primary Examiner* — Edward J Cain
(74) *Attorney, Agent, or Firm* — Knobbe, Martens Olson & Bear LLP

(57) ABSTRACT

The present disclosure relates to a thermoplastic transparent resin composition for a wheel rust cover. The thermoplastic transparent resin composition is excellent in transparency and impact strength and suitable for a vacuum compression thermal molding process. A thermoplastic transparent resin composition for a wheel rust cover includes 20 wt % to 60 wt % of a graft copolymer, 40 wt % to 70 wt % of a non-graft copolymer, and 3 wt % to 10 wt % of a processing aid, in which a total rubber content is 10 wt % to 25 wt %, a total methacrylic acid alkyl ester compound content is 34 wt % to 67 wt %, a total aromatic vinyl compound content is 16 wt % to 40 wt %, and a total vinyl cyan compound content is 0 wt % to 10 wt %.

20 Claims, 2 Drawing Sheets

THERMOPLASTIC TRANSPARENT RESIN COMPOSITION FOR WHEEL RUST COVER AND METHOD FOR PREPARING THE SAME

CROSS-REFERENCE TO RELATED APPLICATION

This application claims under 35 U.S.C. § 119(a) the benefit of Korean Patent Application No. 10-2017-0144560 filed Nov. 1, 2017, the entire contents of which are incorporated herein by reference.

BACKGROUND (a) Field

The present disclosure relates to a thermoplastic transparent resin composition for a wheel rust cover, which is excellent in transparency and impact strength and suitable for a vacuum compression thermal molding process, and a method for preparing the same.

(b) Background Art

In general, an automobile is equipped with a braking device for slowing down a running speed of the automobile or stopping the automobile, that is, a brake device, and a principle in which an automobile is braked by friction resistance between a disk and a brake pad is applied to the brake device.

Since the disk of the brake device has a surface thereof exposed to the outside air, rust is generated on the surface of the disk by oxidation reactions when the brake device is not used for a long period of time such as when a vehicle is shipped, and then stored for a long period of time, and when a wheel rust cover is mounted on a wheel of an automobile, the aforementioned-problem may be solved.

In general, the wheel rust cover has been manufactured by using an opaque resin in order to prevent a corrosion phenomenon on the surface of the disk, but as the design of an automobile wheel has recently become important, there is a high need for a transparent resin.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

A transparent acrylonitrile-butadiene-styrene (ABS) resin is a representative transparent material which is excellent in transparency, impact strength, and processability. However, since a wheel rust cover is usually manufactured by a vacuum compression thermal molding, it is evaluated that the transparent ABS resin is not suitable due to damage to the transparent ABS resin, such as occurrence of holes in the process, or generation of haze.

The present disclosure has been made in an effort to provide a thermoplastic transparent resin composition for a wheel rust cover, which is excellent in transparency and impact strength and suitable for a vacuum compression thermal molding process, and a method for preparing the same.

The aspect of the present invention is not limited to the aforementioned object. The aspect of the present invention will be more apparent from the following description and will be realized by means described in the claims and by combinations thereof.

In one aspect, the present invention provides a thermoplastic transparent resin composition for a wheel rust cover, the thermoplastic transparent resin composition including: 20 wt % to 60 wt % of a graft copolymer; 40 wt % to 70 wt % of a non-graft copolymer; and 3 wt % to 10 wt % of a processing aid, in which a total rubber content is 10 wt % to 25 wt %, a total methacrylic acid alkyl ester compound content is 34 wt % to 67 wt %, a total aromatic vinyl compound content is 16 wt % to 40 wt %, and a total vinyl cyan compound content is 0 wt % to 10 wt %.

In embodiments, the graft copolymer may be prepared by graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % of a conjugated diene rubber latex.

In another embodiment, the graft copolymer may have a weight average molecular weight of 80,000 g/mol to 150,000 g/mol.

In still another embodiment, the non-graft copolymer may be prepared by polymerizing 40 wt % to 74 wt % of the methacrylic acid alkyl ester compound, 20 wt % to 50 wt % of the aromatic vinyl compound, and 0 wt % to 20 wt % of the vinyl cyan compound.

In yet another embodiment, the non-graft copolymer may have a weight average molecular weight of 80,000 g/mol to 150,000 g/mol.

In still yet another embodiment, the processing aid may be prepared by polymerizing 50 wt % to 75 wt % of the methacrylic acid alkyl ester compound and 25 wt % to 50 wt % of the aromatic vinyl compound.

In a further embodiment, the processing aid may have a weight average molecular weight of 200,000 g/mol to 350,000 g/mol.

In another further embodiment, the methacrylic acid alkyl ester compound may be methyl methacrylate, the aromatic vinyl compound may be selected from the group consisting of styrene, α-methylstyrene, o-ethylstyrene, p-ethylstyrene, vinyltoluene, and a combination thereof, and the vinyl cyan compound may be selected from the group consisting of acrylonitrile, methacrylonitrile, ethacrylonitrile, and a combination thereof.

In still another further embodiment, a difference in refractive indices between the conjugated diene rubber latex of the graft copolymer and a polymer grafted thereto may be 0.01 or less.

In yet another further embodiment, a difference in refractive indices between the graft copolymer and the non-graft copolymer may be 0.01 or less, a difference in refractive indices between the graft copolymer and the processing aid may be 0.01 or less, and a difference in refractive indices between the non-graft copolymer and the processing aid may be 0.01 or less.

In still yet another further embodiment, the graft copolymer, the non-graft copolymer, and the processing aid may have the same refractive index.

In a still further embodiment, the thermoplastic transparent resin composition may further include an additive selected from the group consisting of a heat stabilizer, a UV stabilizer, a lubricant, and a combination thereof.

In another aspect, the present invention provides a method for preparing a thermoplastic transparent resin composition for a wheel rust cover, the method including: preparing a graft copolymer; preparing a non-graft copolymer; preparing a processing aid; and kneading 20 wt % to 60 wt % of the graft copolymer, 40 wt % to 70 wt % of the non-graft copolymer, and 3 wt % to 10 wt % of the processing aid.

In embodiments, the graft copolymer may be prepared by graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % of a conjugated diene rubber latex. In another embodiment, the graft copolymer may be prepared so as to have a weight average molecular weight of 80,000 g/mol to 150,000 g/mol by adding a molecular weight adjusting agent.

In still another embodiment, the non-graft copolymer may be prepared by polymerizing 40 wt % to 74 wt % of the methacrylic acid alkyl ester compound, 20 wt % to 50 wt % of the aromatic vinyl compound, and 0 wt % to 20 wt % of the vinyl cyan compound. In yet another embodiment, the non-graft copolymer may be prepared so as to have a weight average molecular weight of 80,000 g/mol to 150,000 g/mol by adding a molecular weight adjusting agent.

In still yet another embodiment, the processing aid may be prepared by polymerizing 50 wt % to 75 wt % of the methacrylic acid alkyl ester compound and 25 wt % to 50 wt % of the aromatic vinyl compound. In a further embodiment, the processing aid may be prepared so as to have a weight average molecular weight of 200,000 g/mol to 350,000 g/mol by adding a molecular weight adjusting agent.

In another further embodiment, the graft copolymer, the non-graft copolymer, and the processing aid may be prepared by means of an emulsion polymerization or a suspension polymerization.

In still another further embodiment, the kneading may be performed by introducing an additive selected from the group consisting of a heat stabilizer, a UV stabilizer, a lubricant, and a combination thereof into the graft copolymer, the non-graft copolymer, and the processing aid.

According to embodiments of the present invention, it is possible to obtain a thermoplastic transparent resin composition for a wheel rust cover, which is excellent in transparency and impact strength and suitable for a vacuum compression thermal molding process.

The effects of the present invention are not limited to the aforementioned effects. The effects of the present invention are to be understood to include all the effects capable of being inferred from the following explanation.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain embodiments thereof illustrated in the accompanying drawings which are given hereinbelow by way of illustration only, and thus are not limitative of the present invention, and wherein.

Figure 1:
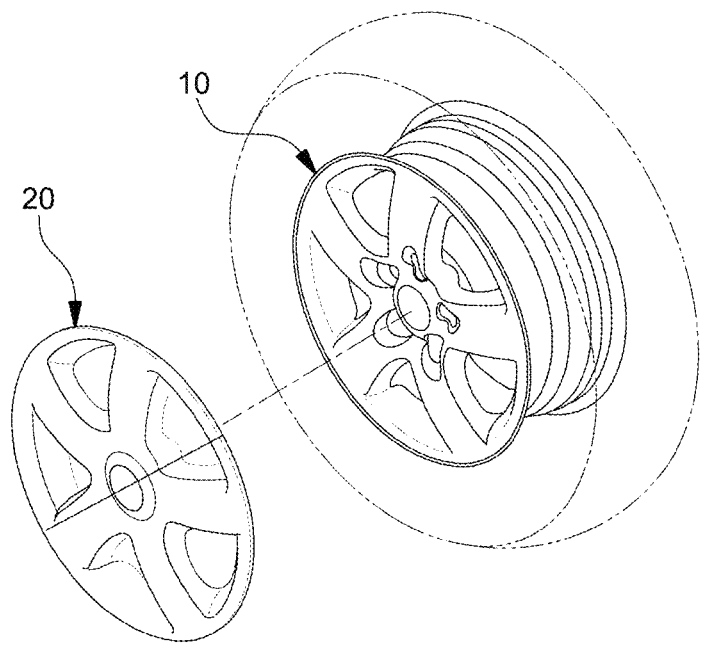
FIG. 1 is a view for describing a typical wheel rust cover.

Reference numerals set forth in the Drawings includes reference to the following elements as further discussed below 10: wheel
20: wheel rust cover It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with embodiments, it will be understood that present description is not intended to limit the invention to those embodiments. On the contrary, the invention is intended to cover not only the embodiments, but also various alternatives, modifications, equivalents and other embodiments, which may be included within the spirit and scope of the invention as defined by the appended claims.

The above objects, other objects, characteristics, and advantages of the present invention will be easily understood through the following Examples related to the accompanying drawings. However, the present invention is not limited to the Examples described herein, and may be implemented in various different forms. On the contrary, the Examples introduced herein are provided to make the disclosed content thorough and complete, and sufficiently transfer the spirit of the present invention to the person skilled in the art.

In a description of each drawing, like reference numerals are used for like constituent elements. In the accompanying drawings, the dimensions of the structures are illustrated while being enlarged compared with actual dimensions for clarity of the present invention. Terms such as first and second may be used to explain various constituent elements, but the constituent elements are not limited by the terms. The terms are used only to distinguish one constituent element from another constituent element. For example, without departing from the scope of the invention, a first constituent element may be named as a second constituent element, and similarly, the second constituent element may be named as the first constituent element. Singular expressions used herein include plural expressions unless the singular expressions have definitely opposite meanings in the context.

In the present application, it will be appreciated that the term "include" or "have" is intended to designate the existence of characteristics, numbers, steps, operations, constituent elements, and parts described in the specification or a combination thereof, and does not exclude in advance a possibility of the existence or addition of one or more other characteristics, numbers, steps, operations, constituent elements, and components, or a combination thereof. Furthermore, a case where a part such as a layer, a film, a region, and a plate is present "over" another part includes not only a case where the part is present "immediately on" another part, but also a case where still another part is present therebetween. In contrast, a case where a part such as a layer, a film, a region, and a plate is present "beneath" another part includes not only a case where the part is present "immediately below" another part, but also a case where still another part is present therebetween.

Unless otherwise specifically described, all numbers, values, and/or expressions for expressing quantities of ingredients, reaction conditions, polymer compositions, and mixtures, which are used in the specification, are to be understood as modified in all instances by the term "about" because these numbers are essentially approximations that are reflective of, among other things, various uncertainties of measurement encountered in obtaining such values. In addition, when a numerical range is disclosed in the present description, the numerical range is continuous, and includes, unless otherwise indicated, every value up to a maximum value, which includes a minimum value to the maximum value of the numerical range. Furthermore, when the numerical range refers to integers, unless otherwise indicated, the integers include every integer up to a maximum value, which includes a minimum value to the maximum value.

It will be appreciated that throughout the present specification, when a range is described for a variable, the variable includes all the values in the described range including the end points described in the range. It will be appreciated that for example, a range of "5 to 10" includes not only values of 5, 6, 7, 8, 9, and 10, but also any sub range of 6 to 10, 7 to 10, 6 to 9, 7 to 9, and the like, and also includes any value between appropriate integers within the described range, such as 5.5, 6.5, 7.5, 5.5 to 8.5, and 6.5 to 9. Further, it will be appreciated that for example, a range of "10% to 30%" includes not only all the integers including values of 10%, 11%, 12%, 13%, and the like and up to 30%, but also any sub range of 10% to 15%, 12% to 18%, 20% to 30%, and the like, and also includes any value between appropriate integers within the described range, such as 10.5%, 15.5%, and 25.5%.

FIG. 1 schematically illustrates a wheel rust cover.

A wheel rust cover 20 is mounted on the outer side of a wheel 10 of a vehicle, and prevents a wheel or a brake device from being contaminated or rusted when the vehicle moves and is stored outdoors.

Figure 2:
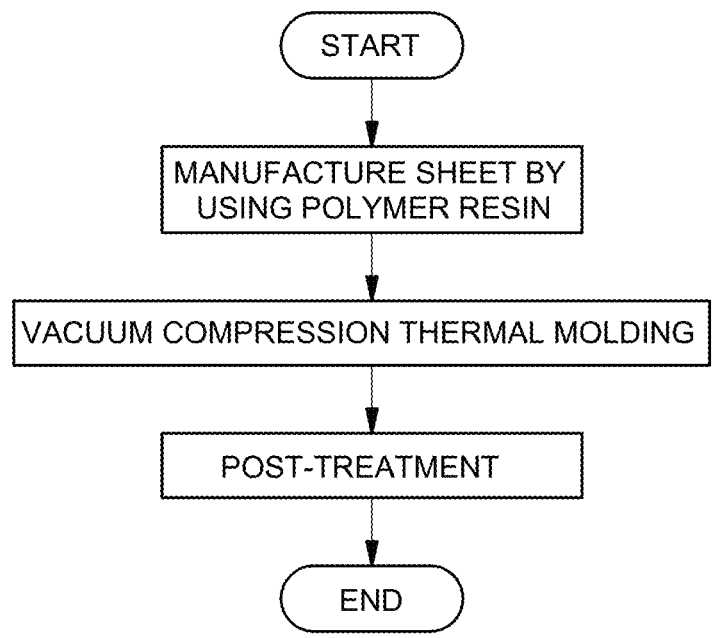
FIG. 2 is a view schematically illustrating a method for preparing a wheel rust cover.

FIG. 2 schematically illustrates a method for preparing the wheel rust cover 20.

First, a pellet of a polymer resin is put into an extruder and melted, and then extruded through a roller, thereby manufacturing a sheet having a predetermined thickness.

The sheet is cut into a size similar to that of a product, mounted onto a vacuum compression thermal molding machine, and then heated at a temperature of about 150° C. to impart fluidity and ductility to the sheet, and then subjected to vacuum compression thermal molding.

The resulting product is polished and subjected to a post-treatment process such as inspection and packaging, thereby finally obtaining a wheel rust cover.

As described above, the wheel rust cover is manufactured by vacuum compression thermal molding, and since a polymer resin is expanded or shrunk by an inherent linear expansion coefficient according to a change in temperature, dimensional stability of a product may deteriorate when a material having a high degree of deformation is used.

Thus, an aspect of the present invention is to provide a thermoplastic transparent resin for a wheel rust cover, which is suitable for vacuum compression thermal molding, excellent in transparency, and does not generate haze.

A thermoplastic transparent resin for a wheel rust cover according to embodiments of the present invention includes 20 wt % to 60 wt % of a graft copolymer, 40 wt % to 70 wt % of a non-graft copolymer, and 3 wt % to 10 wt % of a processing aid.

For the thermoplastic transparent resin, a total rubber content may be 10 wt % to 25 wt %, a total methacrylic acid alkyl ester compound content may be 34 wt % to 67 wt %, a total aromatic vinyl compound content may be 16 wt % to 40 wt %, and a total vinyl cyan compound content may be 0 wt % to 10 wt %.

Optical properties of the thermoplastic transparent resin such as transparency and haze are associated with the refractive indices of a graft copolymer, a non-graft copolymer, and a processing aid, and the suitability for vacuum compression thermal molding is associated with the molecular weights of the graft copolymer and the non-graft copolymer and the amount of processing aid used, and each ingredient will be described in more detail.

The graft copolymer is prepared by graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % (based on a solid content) of a conjugated diene rubber latex.

The conjugated diene rubber latex is a polymer of a conjugated compound having a structure in which a double bond and a single bond are alternately arranged. The conjugated diene rubber latex may be a butadiene polymer, a butadiene-styrene copolymer (SBR), a butadiene-acrylonitrile copolymer (NBR), an ethylene-propylene copolymer (EPDM), or a polymer derived therefrom, and may be preferably a butadiene polymer and a butadiene-styrene copolymer.

The conjugated diene rubber latex may have an average particle diameter of 800 Å to 3,500 Å and a gel content of 50 wt % to 95 wt %.

In the graft copolymer, a content of the conjugated diene rubber latex may be 30 wt % to 65 wt % based on the solid content. In the present description, the content based on the 'solid content' means a content of a solute or a content included in a solution or a solvent. When the content of the conjugated diene rubber latex is less than 30 wt %, the impact strength of a wheel rust cover manufactured of a thermoplastic transparent resin composition may be reduced, and when the content thereof is more than 65 wt %, processing characteristics through vacuum compression thermal molding may deteriorate.

However, the invention is not limited to numerical ranges discussed above. In embodiments, the conjugated diene rubber latex is in an amount of about 27.25, 27.5, 27.75, 28, 28.25, 28.5, 28.75, 29, 29.1, 29.2, 29.3, 29.4, 29.5, 29.6, 29.7, 29.8, 29.9, 30, 30.1, 30.2, 30.3, 30.4, 30.5, 30.6, 30.7, 30.8, 30.9, 31, 33, 35, 37, 40, 50, 55, 60, 63, 64, 64.1, 64.1, 64.2, 64.3, 64.4, 64.5, 64.6, 64.7, 64.8, 64.9, 65, 65.1, 65.2, 65.3, 65.4, 65.5, 65.6, 65.7, 65.8, 65.9, 66 wt %. In embodiments, amount of the conjugated diene rubber latex in a range formed by any two numbers selected from those listed in the proceeding sentence.

The methacrylic acid alkyl ester compound, the aromatic vinyl compound, and the vinyl cyan compound are monomers grafted to the conjugated diene rubber latex, and hereinafter, each configuration will be described in detail.

The methacrylic acid alkyl ester compound may be methacrylic acid methyl ester, methacrylic acid ethyl ester, methacrylic acid propyl ester, methacrylic acid 2-ethylhexyl ester, methacrylic acid decyl ester, or methacrylic acid lauryl ester, and may be preferably methacrylic acid methyl ester.

In the graft copolymer, a content of the methacrylic acid alkyl ester may be 18 wt % to 52 wt %.

The aromatic vinyl compound may be selected from the group consisting of styrene, α-methylstyrene, o-ethylstyrene, p-ethylstyrene, vinyltoluene, and a combination thereof, and may be preferably styrene.

In the graft copolymer, a content of the aromatic vinyl compound may be 9 wt % to 31 wt %.

The vinyl cyan compound may be selected from the group consisting of acrylonitrile, methacrylonitrile, ethacrylonitrile, and a combination thereof.

In the graft copolymer, a content of the vinyl cyan compound may be 0 wt % to 10 wt %.

The smaller the difference in refractive indices between the conjugated diene rubber latex and a polymer grafted thereto is, the better the transparency of the graft copolymer is. For example, the difference in refractive indices between the conjugated diene rubber latex and the polymer grafted thereto may be 0.01 or less, and it is most that the conjugated diene rubber latex and the polymer grafted thereto have the same refractive index.

Since the refractive index of the grafted polymer is adjusted by a mixing ratio of the above-described monomers, the transparency of the graft copolymer may deteriorate when the content of each constitution is not the same as described above.

Refractive indices of the graft copolymer, the conjugated diene rubber latex, and the polymer grafted thereto may be calculated as follows.

$$RI_1 = \Sigma Wt_{1,i} * RI_{1,i}$$

$RI_1$=Refractive index of copolymer (the copolymer may be a graft copolymer, or a grafted polymer)

$Wt_{1,i}$=Content (%) of each ingredient included in the copolymer $RI_{1,i}$=Refractive index of each ingredient included in the copolymer As an example, since butadiene, which is the conjugated diene rubber latex, has a refractive index of 1.518, methacrylic acid methyl ester, which is the methacrylic acid alkyl ester compound, has a refractive index of 1.49, styrene, which is the aromatic vinyl compound, has a refractive index of 1.59, and acrylonitrile, which is the vinyl cyan compound, has a refractive index of 1.52, the difference in refractive indices between the conjugated diene rubber latex and the polymer grafted thereto may be reduced by adjusting the compounding ratio of each ingredient, and accordingly, the transparency of the graft copolymer may be improved.

The graft copolymer may have a weight average molecular weight of 80,000 g/mol to 300,000 g/mol, specifically, 80,000 g/mol to 150,000 g/mol. When the weight average molecular weight is less than 80,000 g/mol (not absolute), the impact strength of a wheel rust cover manufactured of a thermoplastic transparent resin composition may be reduced, and when the weight average molecular weight is more than 150,000 g/mol (not absolute), the fluidity of the thermoplastic transparent resin composition deteriorates, and as a result, processing characteristics through vacuum compression thermal molding may deteriorate.

However, the invention is not limited to numerical ranges discussed above. In embodiments, the weight average molecular weight of the graft copolymer is about 75000, 76000, 77000, 78500, 79000, 79500, 80000, 80500, 81000, 81500, 82000, 82500, 83000, 83500, 84000, 84500, 85000, 90000, 95000, 100000, 105000, 110000, 115000, 120000, 125000, 130000, 135000, 140000, 145000, 147500, 148000, 148500, 149000, 149500, 150000, 150500, 151000, 151500, 152000, 152500, 153000, 153500, 154000, 154500, or 155000 g/mol. In embodiments, the weight average molecular weight of the graft copolymer is in a range formed by any two numbers selected from those listed in the proceeding sentence.

The weight average molecular weight of the graft copolymer may be adjusted by introducing a molecular weight adjusting agent in the polymerization process. The molecular weight adjusting agent may be dodecylmercaptan such as n-dodecylmercaptan and t-dodecylmercaptan, or an α-methyl styrene dimer.

Next, the non-graft copolymer is prepared by polymerizing 40 wt % to 74 wt % of the methacrylic acid alkyl ester compound, 20 wt % to 50 wt % of the aromatic vinyl compound, and 0 wt % to 20 wt % of the vinyl cyan compound.

The methacrylic acid alkyl ester compound may be methacrylic acid methyl ester, methacrylic acid ethyl ester, methacrylic acid propyl ester, methacrylic acid 2-ethylhexyl ester, methacrylic acid decyl ester, or methacrylic acid lauryl ester, and may be preferably methacrylic acid methyl ester.

The aromatic vinyl compound may be selected from the group consisting of styrene, α-methylstyrene, o-ethylstyrene, p-ethylstyrene, vinyltoluene, and a combination thereof, and may be preferably styrene.

The vinyl cyan compound may be selected from the group consisting of acrylonitrile, methacrylonitrile, ethacrylonitrile, and a combination thereof.

The smaller the difference in refractive indices between the graft copolymer and the non-graft copolymer is, the better the transparency of the thermoplastic transparent resin composition is. For example, the difference in refractive indices between the graft copolymer and the non-graft copolymer may be 0.01 or less, and it is most that the graft copolymer and the non-graft copolymer have the same refractive index.

Since the refractive index of the non-graft copolymer is adjusted by a mixing ratio of the methacrylic acid alkyl ester compound, the aromatic vinyl compound, and the vinyl cyan compound, the transparency of the thermoplastic transparent resin composition may deteriorate when the content of each constitution is not the same as described above.

A refractive index ($RI_2$) of the non-graft copolymer may be calculated as follows.

$$RI_2 = \Sigma Wt_{2,i} * RI_{2,i}$$

$Wt_{2,i}$=Content (%) of each ingredient included in the non-graft copolymer $RI_{,i}$=Refractive index of each ingredient included in the non-graft copolymer The non-graft copolymer may have a weight average molecular weight of 80,000 g/mol to 300,000 g/mol, specifically, 80,000 g/mol to 150,000 g/mol. When the weight average molecular weight is less than 80,000 g/mol (not absolute), the impact strength of a wheel rust cover manufactured of a thermoplastic transparent resin composition may be reduced, and when the weight average molecular weight is more than 150,000 g/mol (not absolute), the fluidity of the thermoplastic transparent resin composition deteriorates, and as a result, processing characteristics through vacuum compression thermal molding may deteriorate.

However, the invention is not limited to numerical ranges discussed above. In embodiments, the weight average molecular weight of the non-graft copolymer is about 75000, 76000, 77000, 78500, 79000, 79500, 80000, 80500, 81000, 81500, 82000, 82500, 83000, 83500, 84000, 84500, 85000, 90000, 95000, 100000, 105000, 110000, 115000, 120000, 125000, 130000, 135000, 140000, 145000, 147500, 148000, 148500, 149000, 149500, 150000, 150500, 151000, 151500, 152000, 152500, 153000, 153500, 154000, 154500, or 155000 g/mol, In embodiments, the weight average molecular weight of the non-graft copolymer is in a range formed by any two numbers selected from those listed in the proceeding sentence.

The weight average molecular weight of the non-graft copolymer may be adjusted by introducing a molecular weight adjusting agent in the polymerization process. The molecular weight adjusting agent may be dodecylmercaptan such as n-dodecylmercaptan and t-dodecylmercaptan, or an α-methyl styrene dimer.

Next, the processing aid is prepared by polymerizing 50 wt % to 75 wt % of the methacrylic acid alkyl ester compound and 25 wt % to 50 wt % of the aromatic vinyl compound.

The methacrylic acid alkyl ester compound may be methacrylic acid methyl ester, methacrylic acid ethyl ester, methacrylic acid propyl ester, methacrylic acid 2-ethylhexyl ester, methacrylic acid decyl ester, or methacrylic acid lauryl ester, and may be preferably methacrylic acid methyl ester.

The aromatic vinyl compound may be selected from the group consisting of styrene, α-methylstyrene, o-ethylstyrene, p-ethylstyrene, vinyltoluene, and a combination thereof, and may be preferably styrene.

The smaller the difference in refractive indices between the processing aid and the graft copolymer and the difference in refractive indices between the processing aid and the non-graft copolymer are, the better the transparency of the thermoplastic transparent resin composition is. For example, the difference in refractive indices may be 0.01 or less, and it is most that the processing aid and the graft copolymer and the processing aid and the non-graft copolymer have the same refractive index.

Since the refractive index of the processing aid is adjusted by a mixing ratio of the methacrylic acid alkyl ester compound and the aromatic vinyl compound, the transparency of the thermoplastic transparent resin composition may deteriorate when the content of each constitution is not the same as described above.

A refractive index ($RI_3$) of the processing aid may be calculated as follows.

$$RI_3 = \Sigma Wt_{3,i} * RI_{3,i}$$

$Wt_{3,i}$=Content (%) of each ingredient included in the non-graft copolymer $RI_{3,i}$=Refractive index of each ingredient included in the non-graft copolymer The processing aid may have a weight average molecular weight of 200,000 g/mol to 300,000 g/mol. When the weight average molecular weight is less than 200,000 g/mol (not absolute), it may be difficult to maintain the form during the vacuum compression thermal molding process, and when the weight average molecular weight is more than 350,000 g/mol (not absolute), the fluidity of the thermoplastic transparent resin composition deteriorates, and as a result, processing characteristics through vacuum compression thermal molding may deteriorate.

However, the invention is not limited to numerical ranges discussed above. In embodiments, the weight average molecular weight of the processing aid is about 190000, 191000, 192000, 193000, 194000, 195000, 196000, 197000, 197500, 198000, 198500, 199000, 199500, 200000, 200500, 201000, 201500, 202000, 202500, 203000, 203500, 204000, 204500, 205000, 210000, 220000, 230000, 240000, 250000, 260000, 270000, 280000, 290000, 291000, 292000, 293000, 294000, 295000, 296000, 297000, 297500, 298000, 298500, 299000, 299500, 300000, 300500, 301000, 301500, 302000, 302500, 303000, 303500, 304000, 304500, 305000, 305500, 306000, 306500, 307000, 307500, 308000, 308500, 309000, 309500, or 310000 g/mol. In embodiments, the weight average molecular weight of the processing aid is in a range formed by any two numbers selected from those listed in the proceeding sentence.

The weight average molecular weight of the processing aid may be adjusted by introducing a molecular weight adjusting agent in the polymerization process. The molecular weight adjusting agent may be dodecylmercaptan such as n-dodecylmercaptan and t-dodecylmercaptan, or an α-methyl styrene dimer.

Figure 3:
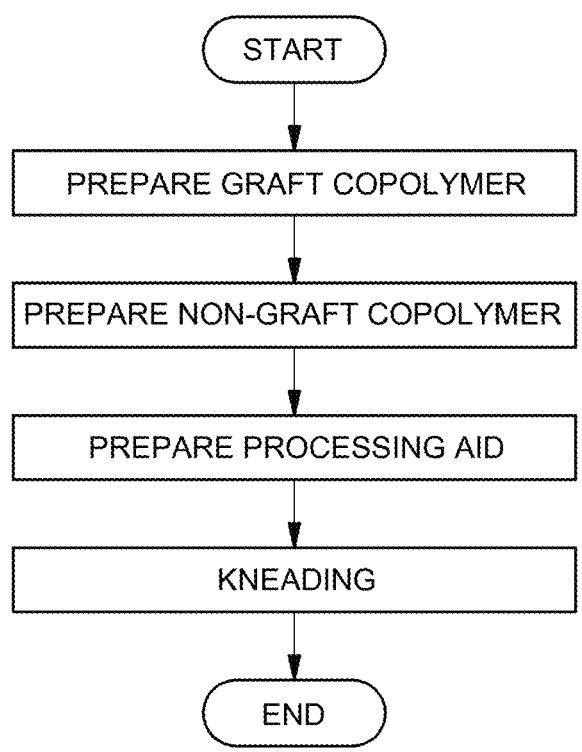
FIG. 3 is a view illustrating a method for preparing a thermoplastic transparent resin composition for a wheel rust cover according to embodiments of the present invention.

FIG. 3 illustrates a method for preparing a thermoplastic transparent resin composition for a wheel rust cover according to embodiments of the present invention. Referring to FIG. 3, the preparation method includes: preparing a graft copolymer; preparing a non-graft copolymer; preparing a processing aid; and kneading the graft copolymer, the non-graft copolymer, and the processing aid.

In the present description, the mixing means that a particle and a particle are mixed with each other while maintaining the forms thereof, and the kneading means that a particle and a particle are homogeneously mixed with each other while being broken or deformed.

The preparing of the graft copolymer may be graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % of a conjugated diene rubber latex. At this time, the weight average molecular weight of the graft copolymer may become 80,000 g/mol to 300,000 g/mol, specifically, 80,000 g/mol to 150,000 g/mol by adding a molecular weight adjusting agent in the polymerization process.

The preparing of the non-graft copolymer may be polymerizing 40 wt % to 74 wt % of the methacrylic acid alkyl ester compound, 20 wt % to 50 wt % of the aromatic vinyl compound, and 0 wt % to 20 wt % of the vinyl cyan compound. At this time, the weight average molecular weight of the non-graft copolymer may become 80,000 g/mol to 300,000 g/mol, specifically, 80,000 g/mol to 150,000 g/mol by adding a molecular weight adjusting agent in the polymerization process.

The preparing of the processing aid may be polymerizing 50 wt % to 75 wt % of the methacrylic acid alkyl ester compound and 25 wt % to 50 wt % of the aromatic vinyl compound. At this time, the weight average molecular weight of the processing aid may become 200,000 g/mol to 300,000 g/mol by adding a molecular weight adjusting agent in the polymerization process.

A method for polymerizing the graft copolymer, the non-graft copolymer, and the processing aid is not particularly limited, and may be, for example, an emulsion polymerization or a suspension polymerization. However, when a bulk polymerization is performed, it may be difficult to increase the weight average molecular weight to a desired level because there is difficulty in processing.

The kneading of the graft copolymer, the non-graft copolymer, and the processing aid may be obtaining a thermoplastic transparent resin composition for a wheel rust cover, which has a total rubber content of 10 wt % to 25 wt %, a total methacrylic acid alkyl ester compound content of 34 wt % to 67 wt %, a total aromatic vinyl compound content of 16 wt % to 40 wt %, and a total vinyl cyan compound content of 0 wt % to 10 wt %, by kneading 20 wt % to 60 wt % of the graft copolymer, 40 wt % to 70 wt % of the non-graft copolymer, and 3 wt % to 10 wt % of the processing aid.

When the content of the processing aid is less than 3 wt % (not absolute), it may be difficult to process the thermoplastic transparent resin composition by a vacuum compression thermal molding process, and when the content of the processing aid is more than 10 wt % (not absolute), it may be difficult to perform an extrusion processing for manufacturing a sheet. However, the invention is not limited to numerical ranges discussed above. In embodiments, the processing aid is in an amount of about 2.1, 2.2, 2.3, 2.4, 2.5, 2.6, 2.7, 2.8, 2.9, 2.91, 2.92, 2.93, 2.94, 2.95, 2.96, 2.97, 2.98, 2.99, 3, 3.01, 3.02, 3.03, 3.04, 3.05, 3.06, 3.07, 3.08, 3.09, 3.1, 3.2, 3.3, 3.5, 3.5, 4, 5, 6, 7, 8, 8.5, 9, 9.1, 9.2, 9.3, 9.4, 9.5, 9.6, 9.7, 9.8, 9.9, 9.91, 9.92, 9.93, 9.94, 9.95, 9.96, 9.97, 9.98, 9.99, 10, 10.01, 10.02, 10.03, 10.04, 10.05, 10.06, 10.07, 10.08, 10.09, 10.1, 10.2, 10.3, 10.4, 10.5, 10.6, 10.7, 10.8, 10.9, 11 wt %. In embodiments, amount of the processing aid is in a range formed by any two numbers selected from those listed in the proceeding sentence.

In the kneading of the graft copolymer, the non-graft copolymer, and the processing aid, a functionality may be imparted to the thermoplastic transparent resin composition by introducing an additive selected from the group consisting of a heat stabilizer, a UV stabilizer, a lubricant, and a combination thereof. The additive may be introduced by selecting the content of the additive within a range not affecting optical properties, and the like of the thermoplastic transparent resin composition.

As the UV stabilizer, benzophenone-based, benzotriazole-based, or hindered phenol-based compounds may be used, and the UV stabilizer may be introduced in an amount of 0.1 part by weight to 2.0 parts by weight based on 100 parts by weight of the thermoplastic transparent resin composition.

EXAMPLES

The following examples illustrate the invention and are not intended to limit the same.

Hereinafter, the present invention will be described in more detail through Examples.

Preparation Example 1-1: Preparation of Graft Copolymer (A-1)

35 wt % of methyl methacrylate (a methacrylic acid alkyl ester compound), 12 wt % of styrene (an aromatic vinyl compound), and 3 wt % of acrylonitrile (a vinyl cyan compound) were graft-polymerized with 50 wt % of a polybutadiene rubber latex (a conjugated diene rubber latex) having a gel content of 70 wt % and an average particle diameter of 2,800 Å.

Specifically, 100 parts by weight of a mixture of the polybutadiene rubber latex, the methyl methacrylate, the styrene, and the acrylonitrile, 1.0 part by weight of a sodium oleate emulsifier, 0.4 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.2 part by weight of cumene hydroperoxide were continuously administered to 100 parts by weight of ion exchange water at 75° C. for 5 hours, and the resulting mixture was reacted. After the reaction, the reactant mixture was warmed to 80° C., and then aged by being left to stand for 1 hour.

The resulting product was aggregated by introducing 2 parts by weight of magnesium sulfate, which is a coagulant, thereinto, and a graft copolymer in the form of a powder was obtained by dehydrating and drying the aggregate. The graft copolymer was found to have a refractive index of 1.516, a graft ratio of 45%, and a weight average molecular weight of 100,000 g/mol.

Preparation Example 1-2: Preparation of Graft Copolymer (A-2)

A graft copolymer was prepared in the same manner as in Preparation Example 1-1, except that 29.8 wt % of methyl methacrylate, 19.2 wt % of styrene, 3 wt % of acrylonitrile were graft-polymerized with 50 wt % of the polybutadiene rubber latex. The graft copolymer was found to have a refractive index of 1.53, a graft ratio of 44%, and a weight average molecular weight of 100,000 g/mol.

Preparation Example 1-3: Preparation of Graft Copolymer (A-3)

A graft copolymer was prepared in the same manner as in Preparation Example 1-1, except that 0.1 part by weight of cumene hydroperoxide and 0.6 part by weight of t-dodecylmercaptan were administered. The graft copolymer was found to have a refractive index of 1.516, a graft ratio of 28%, and a weight average molecular weight of 70,000 g/mol.

Preparation Example 2-1: Preparation of Non-Graft Copolymer (B-1)

70.4 wt % of methyl methacrylate, 24.6 wt % of styrene, and 5 wt % of acrylonitrile were polymerized.

Specifically, 100 parts by weight of a mixture of the methyl methacrylate, the styrene, and the acrylonitrile and 0.15 part by weight of t-dodecylmercaptan were continuously administered to 30 parts by weight of toluene so as for the average reaction time to become 3 hours, and the resulting mixture was reacted. At this time, the reaction temperature was maintained at 148° C.

After completion of the reaction, the resulting product was heated in a preliminary heating bath, and then a non-graft copolymer was obtained by vaporizing unreacted monomers in a volatilization bath. Thereafter, the temperature was maintained at 210° C., and the non-graft copolymer was processed in the form of a pellet by means of a transfer pump extrusion processing machine. The non-graft copolymer was found to have a refractive index of 1.516 and a weight average molecular weight of 110,000 g/mol.

Preparation Example 2-2: Preparation of Non-Graft Copolymer (B-2)

A non-graft copolymer was prepared in the same manner as in Preparation Example 2-1, except that 40 wt % of methyl methacrylate, 50 wt % of styrene, and 10 wt % of acrylonitrile were polymerized. The non-graft copolymer was found to have a refractive index of 1.542.

Preparation Example 2-3: Preparation of Non-Graft Copolymer (B-3)

A non-graft copolymer was prepared in the same manner as in Preparation Example 2-1, except that 0.3 part by weight of n-octyl mercaptan was used instead of t-dodecylmercaptan. The non-graft copolymer was found to have a refractive index of 1.516 and a weight average molecular weight of 60,000 g/mol.

Preparation Example 3-1: Preparation of Processing Aid (C-1)

37 parts by weight of methyl methacrylate, 13 parts by weight of styrene, 0.7 part by weight of Dowfax-2A1 (emulsifier), 0.05 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide were introduced into 100 parts by weight of ion exchange water in a reactor at 50° C., and the resulting mixture was mixed for about 30 minutes.

The temperature of the reactor was increased to 60° C., and a reaction was performed while introducing 37 parts by weight of methyl methacrylate, 13 parts by weight of styrene, 0.05 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide into the reactor for 2 hours. Thereafter, the reactant mixture was warmed to 70° C., and then aged for 1 hour, and the reaction was terminated.

The resulting product was aggregated by introducing 2 parts by weight of magnesium sulfate, which is a coagulant, thereinto, and a processing aid in the form of a powder was obtained by dehydrating and drying the aggregate. The processing aid was found to have a refractive index of 1.516 and a weight average molecular weight of 280,000 g/mol.

Preparation Example 3-2: Preparation of Processing Aid (C-2)

20 parts by weight of methyl methacrylate, 30 parts by weight of styrene, 0.7 part by weight of Dowfax-2A1 (emulsifier), 0.05 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide were introduced into 100 parts by weight of ion exchange water in a reactor at 50° C., and the resulting mixture was mixed for about 30 minutes.

The temperature of the reactor was increased to 60° C., and a reaction was performed while introducing 20 parts by weight of methyl methacrylate, 30 parts by weight of styrene, 0.05 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide into the reactor for 2 hours. Thereafter, the reactant mixture was warmed to 70° C., and then aged for 1 hour, and the reaction was terminated.

The resulting product was aggregated by introducing 2 parts by weight of magnesium sulfate, which is a coagulant, thereinto, and a processing aid in the form of a powder was obtained by dehydrating and drying the aggregate. The processing aid was found to have a refractive index of 1.55 and a weight average molecular weight of 270,000 g/mol.

Preparation Example 3-3: Preparation of Processing Aid (C-3)

37 parts by weight of methyl methacrylate, 13 parts by weight of styrene, 0.7 part by weight of Dowfax-2A1 (emulsifier), 0.2 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide were introduced into 100 parts by weight of ion exchange water in a reactor at 50° C., and the resulting mixture was mixed for about 30 minutes.

The temperature of the reactor was increased to 60° C., and a reaction was performed while introducing 37 parts by weight of methyl methacrylate, 13 parts by weight of styrene, 0.2 part by weight of t-dodecylmercaptan, 0.05 part by weight of ethylene diamine tetraacetic acid, 0.1 part by weight of sodium formaldehyde sulfoxylate, 0.001 part by weight of ferrous sulfide, and 0.1 part by weight of cumene hydroperoxide into the reactor for 2 hours. Thereafter, the reactant mixture was warmed to 70° C., and then aged for 1 hour, and the reaction was terminated.

The resulting product was aggregated by introducing 2 parts by weight of magnesium sulfate, which is a coagulant, thereinto, and a processing aid in the form of a powder was obtained by dehydrating and drying the aggregate. The processing aid was found to have a refractive index of 1.516 and a weight average molecular weight of 110,000 g/mol.

Examples 1 and 2 and Comparative Examples 1 to 6

The graft copolymer, the non-graft copolymer, and the processing aid prepared in each of Preparation Examples 1-1 to 3-3 were mixed as in the following Table 1, 0.2 part by weight of a lubricant, 0.2 part by weight of an antioxidant, and 0.5 part by weight of a UV stabilizer were administered thereto, and the mixture was prepared in the form of a pellet by using a twin-screw extrusion kneader at a cylinder temperature of 220° C. A sample was prepared by injecting the pellet, the transparency and the impact strength were measured, and processing characteristics of vacuum compression thermal molding were evaluated and shown in Table 2.

Gel content (%): A conjugated diene rubber latex was solidified by using diluted acid or metal salt, and then a rubber aggregate obtained by washing the solidified conjugated diene rubber latex and drying the rubber latex in a vacuum oven at 60° C. for 24 hours was cut into small pieces by means of a pair of scissors, and then 1 g of rubber fragments were put into 100 g of toluene and stored in a dark room at room temperature for 48 hours, and then separated into sol and gel, and the gel content was measured according to the following Equations 2 and 3.

Gel content (%)=(weight of an insoluble content (gel)/weight of a sample)*100

Refractive index: The sample was thinly spread to a thickness of about 0.2 mm, and then the refractive index was measured by an Abbe refractometer at 25° C.

Weight average molecular weight: The weight average molecular weight was measured by using GPC. At this time, calibration was performed by using a PMMA standard, and then the molecular weights of the graft copolymer, the non-graft copolymer, and the processing aid were measured.

Transparency (haze value): The transparency was measured in accordance with ASTM1003.

Impact strength: The Notched Izod impact strength was measured in accordance with ASTM245 D256.

Processing characteristics: A sheet was manufactured by extruding and cutting the prepared resin, the sheet was mounted on a vacuum compression thermal molding machine, the temperature was increased to 150° C., and then the sheet was subjected to vacuum compression thermal molding in the form of a wheel rust cover. At this time, it was determined whether a molded article passed the test or not by observing whether the molded article was properly shaped, and the transparency deteriorated by the unaided eye.

Weight average molecular weight: The weight average molecular weight was measured by using GPC. At this time, calibration was performed by using a PMMA standard, and then the molecular weights of the graft copolymer, the non-graft copolymer, and the processing aid were measured.

Transparency (haze value): The transparency was measured in accordance with ASTM1003.

Impact strength: The Notched Izod impact strength was measured in accordance with ASTM245 D256.

Processing characteristics: A sheet was manufactured by extruding and cutting the prepared resin, the sheet was mounted on a vacuum compression thermal molding machine, the temperature was increased to 150° C., and then the sheet was subjected to vacuum compression thermal molding in the form of a wheel rust cover. At this time, it was determined whether a molded article passed the test or not by observing, by the unaided eye, whether the molded article was properly shaped, and the transparency deteriorated.

TABLE 1

| Classification | Graft copolymer (A) | | | MSAN Resin (B) | | | Processing aid (C) | | |
| --- | --- | --- | --- | --- | --- | --- | --- | --- | --- |
| | A-1 | A-2 | A-3 | B-1 | B-2 | B-3 | C-1 | C-2 | C-3 |
| Example 1 | 30 | | | 63 | | | 7 | | |
| Example 2 | 40 | | | 56 | | | 4 | | |
| Comparative Example 1 | | 30 | | 65 | | | 5 | | |
| Comparative Example 2 | 30 | | | | 65 | | 5 | | |
| Comparative Example 3 | | | 30 | | | 68 | 2 | | |
| Comparative Example 4 | 30 | | | 70 | | | | | |
| Comparative Example 5 | 30 | | | 63 | | | | 7 | |
| Comparative Example 6 | 30 | | | 63 | | | | | 7 |

Test Examples

Examples 1 and 2 and Comparative Examples 1 to 6

The graft copolymer, the non-graft copolymer, and the processing aid prepared in each of Preparation Examples 1-1 to 3-3 were mixed as in the following Table 1, 0.2 part by weight of a lubricant, 0.2 part by weight of an antioxidant, and 0.5 part by weight of a UV stabilizer were administered thereto, and the mixture was prepared in the form of a pellet by using a twin-screw extrusion kneader at a cylinder temperature of 220° C. A sample was prepared by injecting the pellet, the transparency and the impact strength were measured, and processing characteristics of vacuum compression thermal molding were evaluated and shown in Table 2.

Gel content (%): A conjugated diene rubber latex was solidified by using diluted acid or metal salt, and then a rubber aggregate obtained by washing the solidified conjugated diene rubber latex and drying the rubber latex in a vacuum oven at 60° C. for 24 hours was cut into small pieces by means of a pair of scissors, and then 1 g of rubber fragments were put into 100 g of toluene and stored in a dark room at room temperature for 48 hours, and then separated into sol and gel, and the gel content was measured according to the following Equations 2 and 3.

Gel content (%)=(weight of an insoluble content (gel)/weight of a sample)*100

Refractive index: The sample was thinly spread to a thickness of about 0.2 mm, and then the refractive index was measured by an Abbe refractometer at 25° C.

TABLE 2

| Classification | Transparency (Haze) | Impact strength (kg · cm/cm) | Processing characteristics |
| --- | --- | --- | --- |
| Example 1 | 2.2 | 17.8 | ○ |
| Example 2 | 2.4 | 21.9 | ○ |
| Comparative Example 1 | 48.9 | 18.9 | ○ |
| Comparative Example 2 | 79.3 | 17.7 | ○ |
| Comparative Example 3 | 2 | 10.2 | X |
| Comparative Example 4 | 2.5 | 5.3 | X |
| Comparative Example 5 | 18.9 | 16.8 | ○ |
| Comparative Example 6 | 2.1 | 13.5 | X |

Referring to Table 2, it can be seen in that Examples 1 and 2, which are the thermoplastic transparent resin compositions according to embodiments of the present invention, transparency and impact strength are excellent, and vacuum compression thermal molding characteristics are excellent.

In contrast, in Comparative Examples 1, 2, and 5, the refractive indices between the conjugated diene rubber latex and the graft copolymer are different from each other, or the refractive indices between the graft copolymer and the non-graft copolymer or the processing aid are different from each other, so that there are problems in that the haze is rapidly increased, and the transparency deteriorates.

In Comparative Example 3, an injection molded article is excellent in transparency, but the graft copolymer and the non-graft copolymer have low molecular weights, and the amount of processing aid used is small, so that vacuum compression thermal molding characteristics are shown to be poor.

It can be seen that Comparative Example 4 does not include a processing aide and thus has poor vacuum compression thermal molding characteristics.

As described above, the Examples of the present invention have been described, but it will be understood by a person with ordinary skill in the art to which the present invention pertains that the present invention can be carried out in other concrete forms without modifying the technical spirit or essential features of the present invention. Therefore, it should be understood that the Examples described above are not limited but illustrative in all respects.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A thermoplastic transparent resin composition for a wheel rust cover, the thermoplastic transparent resin composition comprising:
    20 wt % to 60 wt % of a graft copolymer;
    40 wt % to 70 wt % of a non-graft copolymer; and
    3 wt % to 10 wt % of a processing aid,
    wherein a total rubber content is 10 wt % to 25 wt %, a total methacrylic acid alkyl ester compound content is 34 wt % to 67 wt %, a total aromatic vinyl compound content is 16 wt % to 40 wt %, and a total vinyl cyan compound content is 0 wt % to 10 wt %,
    wherein the processing aid is prepared by polymerizing the methacrylic acid alkyl ester compound and the aromatic vinyl compound.

2. The thermoplastic transparent resin composition of claim 1, wherein the graft copolymer is prepared by graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % of a conjugated diene rubber latex.

3. The thermoplastic transparent resin composition of claim 1, wherein the graft copolymer has a weight average molecular weight of 80,000 g/mol to 150,000 g/mol.

4. The thermoplastic transparent resin composition of claim 1, wherein the non-graft copolymer is prepared by polymerizing 40 wt % to 74 wt % of the methacrylic acid alkyl ester compound, 20 wt % to 50 wt % of the aromatic vinyl compound, and 0 wt % to 20 wt % of the vinyl cyan compound.

5. The thermoplastic transparent resin composition of claim 1, wherein the non-graft copolymer has a weight average molecular weight of 80,000 g/mol to 150,000 g/mol.

6. The thermoplastic transparent resin composition of claim 1, wherein the processing aid is prepared by polymerizing 50 wt % to 75 wt % of the methacrylic acid alkyl ester compound and 25 wt % to 50 wt % of the aromatic vinyl compound.

7. The thermoplastic transparent resin composition of claim 1, wherein the processing aid has a weight average molecular weight of 200,000 g/mol to 350,000 g/mol.

8. The thermoplastic transparent resin composition of claim 2, wherein the methacrylic acid alkyl ester compound is methyl methacrylate,
    the aromatic vinyl compound is selected from the group consisting of styrene, α-methylstyrene, o-ethylstyrene, p-ethylstyrene, vinyltoluene, and a combination thereof, and
    the vinyl cyan compound is selected from the group consisting of acrylonitrile, methacrylonitrile, ethacrylonitrile, and a combination thereof.

9. The thermoplastic transparent resin composition of claim 2, wherein a difference in refractive indices between the conjugated diene rubber latex of the graft copolymer and a polymer grafted thereto is 0.01 or less.

10. The thermoplastic transparent resin composition of claim 1, wherein a difference in refractive indices between the graft copolymer and the non-graft copolymer is 0.01 or less,
    a difference in refractive indices between the graft copolymer and the processing aid is 0.01 or less, and
    a difference in refractive indices between the non-graft copolymer and the processing aid is 0.01 or less.

11. The thermoplastic transparent resin composition of claim 1, wherein the graft copolymer, the non-graft copolymer, and the processing aid have the same refractive index.

12. The thermoplastic transparent resin composition of claim 1, further comprising: an additive selected from the group consisting of a heat stabilizer, a UV stabilizer, a lubricant, and a combination thereof.

13. A method for preparing a thermoplastic transparent resin composition for a wheel rust cover, the method comprising:
    preparing a graft copolymer;
    preparing a non-graft copolymer;
    preparing a processing aid; and
    kneading 20 wt % to 60 wt % of the graft copolymer, 40 wt % to 70 wt % of the non-graft copolymer, and 3 wt % to 10 wt % of the processing aid,
    wherein a total rubber content is 10 wt % to 25 wt %, a total methacrylic acid alkyl ester compound content is 34 wt % to 67 wt %, a total aromatic vinyl compound content is 16 wt % to 40 wt %, and a total vinyl cyan compound content is 0 wt % to 10 wt %,
    wherein the processing aid is prepared by polymerizing the methacrylic acid alkyl ester compound and the aromatic vinyl compound.

14. The method of claim 13, wherein the graft copolymer is prepared by graft-copolymerizing 18 wt % to 52 wt % of a methacrylic acid alkyl ester compound, 9 wt % to 31 wt % of an aromatic vinyl compound, and 0 wt % to 10 wt % of a vinyl cyan compound with 30 wt % to 65 wt % of a conjugated diene rubber latex.

15. The method of claim 13, wherein the graft copolymer is prepared so as to have a weight average molecular weight of 80,000 g/mol to 150,000 g/mol by adding a molecular weight adjusting agent.

16. The method of claim 13, wherein the non-graft copolymer is prepared by polymerizing 40 wt % to 74 wt % of the methacrylic acid alkyl ester compound, 20 wt % to 50 wt % of the aromatic vinyl compound, and 0 wt % to 20 wt % of the vinyl cyan compound.

17. The method of claim 13, wherein the non-graft copolymer is prepared so as to have a weight average molecular weight of 80,000 g/mol to 150,000 g/mol by adding a molecular weight adjusting agent.

18. The method of claim 13, wherein the processing aid is prepared by polymerizing 50 wt % to 75 wt % of the methacrylic acid alkyl ester compound and 25 wt % to 50 wt % of the aromatic vinyl compound.

19. The method of claim 13, wherein the processing aid is prepared so as to have a weight average molecular weight of 200,000 g/mol to 350,000 g/mol by adding a molecular weight adjusting agent.

20. The method of claim 13, wherein the graft copolymer, the non-graft copolymer, and the processing aid are prepared by means of an emulsion polymerization or a suspension polymerization.

* * * * *